US007128429B2

(12) United States Patent
Tausch

(10) Patent No.: US 7,128,429 B2
(45) Date of Patent: Oct. 31, 2006

(54) LIGHT TRAP AND HEAT TRANSFER APPARATUS AND METHOD

(75) Inventor: Mark Tausch, West Chester, OH (US)

(73) Assignee: Mark Andy, Inc., Chesterfield, MO (US)

( * ) Notice: Subject to any disclaimer, the term of this patent is extended or adjusted under 35 U.S.C. 154(b) by 626 days.

(21) Appl. No.: 10/284,473

(22) Filed: Oct. 31, 2002

(65) Prior Publication Data

US 2004/0069937 A1 Apr. 15, 2004

Related U.S. Application Data

(60) Provisional application No. 60/418,193, filed on Oct. 15, 2002.

(51) Int. Cl.
*G02B 27/00* (2006.01)

(52) U.S. Cl. ............. 359/614; 359/601; 359/385

(58) Field of Classification Search ........... 359/601, 359/613, 614, 385; 250/503.1, 504 R; 362/294, 362/345, 92, 373
See application file for complete search history.

(56) References Cited

U.S. PATENT DOCUMENTS

| | | | |
|---|---|---|---|
| 1,744,369 A | 1/1930 | Dietz et al. | |
| 2,108,633 A | 2/1938 | Wiegand et al. | |
| 2,393,616 A | 1/1946 | De Reamer et al. | |
| 3,060,310 A | 10/1962 | Bertsche, Jr. et al. | |
| 3,122,405 A | 2/1964 | Pistey | |
| 3,263,201 A | 7/1966 | Pistey | |
| 3,329,924 A | 7/1967 | Henshaw, Jr. | |
| 3,344,390 A | 9/1967 | Dell | |
| 3,727,040 A | 4/1973 | Armstrong et al. | |
| 3,733,709 A | 5/1973 | Bassemir et al. | |
| 3,783,261 A | 1/1974 | Hartmann | |
| 3,819,929 A | 6/1974 | Newman | |
| 3,865,106 A | 2/1975 | Palush | |
| 3,900,727 A | 8/1975 | Hutz | |
| 3,967,385 A | 7/1976 | Culbertson | |
| 4,149,086 A * | 4/1979 | Nath | 250/504 R |
| 4,422,100 A | 12/1983 | DuVall et al. | |
| 4,443,836 A | 4/1984 | Horiuchi et al. | |
| 4,563,589 A | 1/1986 | Scheffer | |
| 4,574,337 A * | 3/1986 | Poppenheimer | 362/267 |
| 4,604,680 A | 8/1986 | Levin et al. | |
| 4,644,899 A * | 2/1987 | Glaus | 118/642 |
| 5,216,820 A | 6/1993 | Green et al. | |
| 5,339,226 A | 8/1994 | Ishikawa | |

(Continued)

FOREIGN PATENT DOCUMENTS

JP 4-295801 A 10/1992

(Continued)

OTHER PUBLICATIONS

Ronkese, B.J., Metal Wool and Indium Heat Sink, Aug. 1978, IBM Technical Disclosure Bulletin, vol. 21, No. 3, p. 1143-4.*

(Continued)

*Primary Examiner*—Drew A. Dunn
*Assistant Examiner*—Joshua L. Pritchett
(74) *Attorney, Agent, or Firm*—Foley & Lardner LLP

(57) ABSTRACT

A heat sink containing a woolen material is provided for a band-pass filter in a curing lamp. Light having a particular wavelength(s) is transmitted through the band-pass filter and into the heat sink whereas light having other wavelengths is reflected by the band-pass filter. The heat sink absorbs the light transmitted through the band-pass filter and dissipates the heat associated therewith.

27 Claims, 4 Drawing Sheets

U.S. PATENT DOCUMENTS

| | | | |
|---|---|---|---|
| 5,355,198 A | 10/1994 | Saito | |
| 5,394,319 A | 2/1995 | Grenga et al. | |
| 5,414,601 A | 5/1995 | Davenport et al. | |
| 5,440,137 A | 8/1995 | Sowers | |
| 5,510,964 A | 4/1996 | Spitler et al. | |
| 5,552,927 A | 9/1996 | Wheatly et al. | |
| 5,723,937 A | 3/1998 | Whitman et al. | |
| 5,825,041 A | 10/1998 | Belek et al. | |
| 5,932,886 A * | 8/1999 | Arai et al. | 250/504 R |
| 6,076,943 A | 6/2000 | Lassovsky | |
| 6,124,600 A | 9/2000 | Moroishi et al. | |
| 6,200,005 B1 | 3/2001 | Roberts et al. | |
| 6,474,837 B1 | 11/2002 | Belliveau | |
| 6,572,370 B1 * | 6/2003 | Hampden | 432/201 |
| 6,621,087 B1 | 9/2003 | Bisges et al. | |
| 6,646,278 B1 | 11/2003 | Schwarz et al. | |
| 6,719,444 B1 | 4/2004 | Alber et al. | |
| 6,720,566 B1 | 4/2004 | Blandford | |

FOREIGN PATENT DOCUMENTS

| | | |
|---|---|---|
| JP | 11-97732 A | 4/1999 |
| JP | 2001-296607 A | 10/2001 |

OTHER PUBLICATIONS

"Dichroic filters, dichroic mirrors, dichroic cross prisms." *Optical Coatings Japan*. Oct. 3, 2002. TMAE. <http://www.techmark.nl/ocj/dichroics.htm>.

"UVTechnology Offers 100% Complete UV Cure Solutions Cool Cure technology to the Flexo Market". *Mark Andy News Release*. Oct. 3, 2002. Mark Andy Inc. <http://www.markandy.com/news091202d.htm>.

* cited by examiner

LIGHT TRAP AND HEAT TRANSFER APPARATUS AND METHOD

CROSS-REFERENCE TO RELATED APPLICATIONS

This application claims priority to U.S. Provisional Patent Application Ser. No. 60/418,193, filed on Oct. 15, 2002, the contents of which are hereby incorporated by reference. In addition, this application incorporates by reference U.S. patent application Ser. Nos. 10/284,488 and 10/284,489 being filed concurrently herewith.

BACKGROUND OF THE INVENTION

1. Field of the Invention

The present invention relates to the lamps and the heat absorption and transfer properties associated therewith. More particularly, the invention relates in one embodiment to improving heat transfer and light trapping in lamps used in ultraviolet light curing applications.

2. Description of the Related Art

The purpose of a band-pass filter in an optical system is to reflect light in a specific range of wavelengths and to transmit light of a different set of wavelengths. A particular type of band-pass filter, often referred to as a "cold mirror," is used to provide good reflection of light having a wavelengths in a particular range and to transmit light outside of that range. For example, one type of cold mirror reflects light having wavelengths between about 200 nm and about 450 nm (i.e., UV light and the lower end of the visible light spectrum) and transmits light having wavelengths above about 450 nm, i.e., light which includes most visible light and IR light.

Band-pass filters are used to separate light into usable and unusable light. For example, a cold mirror may be used to separate light into ultraviolet ("UV") light and visible/infrared ("IR") light. The UV light may be reflected toward a material, such as a web, that is to be cured via a curing application. By way of contrast, the visible/IR light may be transmitted through the cold mirror (i.e., it is not directed toward the curing application at hand) to prevent unnecessary and unwanted heating of the materials that are to be cured.

FIG. 1 is a schematic view of a prior art lamp housing 100. The lamp housing 100 contains a lamp 26 (also called a "light source 26") which projects diverging light having a variety of wavelengths from the interior 24 of the lamp 26. Some of the light is directed toward a reflective mirror 16 which reflects the light toward a band-pass filter 20 (which may be a cold mirror). In some prior art embodiments, the mirror 16 is planar (as shown) whereas in other prior art embodiments the mirror 16 is curved. However, in all prior art embodiments, at least some of the light reflected by the mirror 16 is redirected back toward the light source 26.

Some of the light from the light source 26 is also reflected off shutters 12 toward the band-pass filter 20. The shutters 12, which rotate on axes 14, have inside surfaces (i.e., on the side facing the light source) which are highly polished. As a result, when an object 8 (which may be in the form of a tape or label) to be cured is moved across a window 22 in the housing 100, the shutters 12 may be opened and the polished surface of the shutters 12 used to gather and direct the light toward the band-pass filter 20.

The shutters 12 may be opened due to their being adapted to rotate on the axes 14. In a first position (not shown), the distal ends 13 of the shutters 12 approach each other, thereby substantially containing the light emitted by light source 26. In a second position, shown in FIG. 1, the distal ends 13 of the shutters 12 are separated so that the light emitted by the light source 26 can be reflected toward the band-pass filter 20.

The shutters 12 also serve a heat containment function. The temperature of the light source 26 may reach from about 650° C. to about 850° C. In some embodiments, as the light source 26 is reasonably close to the moving object 8, if the object 8 is stopped while the lamp housing 100 is emitting light, it may be preferable to protect the object 8 from the heat associated with the light emitted by light source 26 by closing the shutters 12.

The band-pass filter 20 is adapted to reflect light having a wavelength which falls within a specified range and to transmit light having wavelengths outside of that range. For example, in curing applications, if a cold mirror is used for the band-pass filter 20, it may reflect light having wavelengths between about 200 nm and about 450 nm (e.g., ultraviolet light) and transmit light outside of this range, including visible light and IR light. The light which is reflected by the cold mirror passes through a protective window 22 and may be used in applications calling for a particular type of light, e.g., UV light.

As the remaining light (e.g. visible/IR) is transmitted through the band-pass filter, it may be necessary to protect people and/or items which may be harmed by exposure to this light. To address this concern, the light which is transmitted through the band-pass filter may pass through an air corridor 52 and into a solid heat sink 30 where it may be absorbed and converted into heat energy via radiant heat transfer.

Air, which is fed into the air corridor 52 via inlets 50, may be used to cool the heat sink 30. Similarly, air may be fed into the housing 100 via inlets 40. The air passing through the inlets 40 may be used to cool the light source 26, the mirror 16, and/or the shutters 12. Further, the heat sink 30 may be designed so that its shape and cross-sectional area will allow the heat absorbed therein to be transferred to a stream of cooling air in the air corridor 52 via forced/induced convection. Unfortunately, the heat sinks currently used tend to be large and expensive.

Thus, although a solution, in the form of a heat sink apparatus, currently exists to absorb visible and infrared light transmitted through a band-pass filter, the solution is imperfect due to the size and cost of the heat sink apparatus. In light of the aforementioned, it is desired to achieve one or more of the following in a new apparatus and method: (a) effectively absorbing visible/IR light; (b) dissipating the heat associated with the light absorption; and/or (c) reducing the size and/or cost of heat sinks used for this purpose.

SUMMARY OF THE INVENTION

The invention herein contains multiple embodiments including a lamp light trap and heat transfer apparatus. This apparatus includes a light source adapted to radiate light having a plurality of wavelengths including light having a wavelength in a first range and a wavelength outside of the first range. The apparatus further includes a band-pass filter positioned in the path of at least some of the light which the light source is adapted to radiate, the band-pass filter being adapted to reflect light having wavelengths in the first range and to transmit light having wavelengths outside of the first range. In addition, the apparatus includes a heat sink provided proximate the band-pass filter, i.e., the heat sink is either adjacent the band-pass filter or separated therefrom by a small distance. The heat sink is formed of a woolen material which is adapted to absorb the light transmitted by the band-pass filter.

In another embodiment of the lamp light trap and heat transfer apparatus, the woolen material may be selected from the group consisting of steel, aluminum, carbon steel, stainless steel, and bronze.

In another embodiment of the lamp light trap and heat transfer apparatus, a protective window shielding access to the band-pass filter may be provided; the light reflected by the band-pass filter may pass through the protective window.

In another embodiment of the lamp light trap and heat transfer apparatus, the apparatus may also include an air cooling corridor positioned between the band-pass filter and the heat sink; the air cooling corridor may be adapted to aid in dissipation of heat generated when the light transmitted through the band-pass filter is absorbed by the heat sink.

In another embodiment, the apparatus may also include an air cooling corridor positioned between the band-pass filter and the heat sink; the air cooling corridor may be adapted to aid in dissipation of heat generated when the light transmitted through the band-pass filter is absorbed by the heat sink. Further, the apparatus of this embodiment may include a protective window shielding access to the band-pass filter; the light reflected by the band-pass filter may pass through the protective window.

In another embodiment, the apparatus may also include an air cooling corridor positioned between the band-pass filter and the heat sink; the air cooling corridor may be adapted to aid in dissipation of heat generated when the light transmitted through the band-pass filter is absorbed by the heat sink. Further, the apparatus of this embodiment may include a protective window shielding access to the band-pass filter; the light reflected by the band-pass filter may pass through the protective window. In addition, in this embodiment, the woolen material may be selected from the group consisting of steel, aluminum, carbon steel, stainless steel, and bronze.

In another embodiment of the lamp light trap and heat transfer apparatus, the light in the first range may have wavelengths between about 200 nm and about 450 nm.

In another embodiment of the lamp light trap and heat transfer apparatus, the light outside of the first range may have wavelengths of greater than about 450 nm.

In another embodiment of the lamp light trap and heat transfer apparatus, the band-pass filter may be a cold mirror.

In another embodiment of the lamp light trap and heat transfer apparatus, the light in the first range may be ultraviolet light; the light outside of the first range may be visible light, infrared light, or a combination of visible light and infrared light.

In another embodiment of the lamp light trap and heat transfer apparatus, band-pass filter mirror may be planar.

In another embodiment of the lamp light trap and heat transfer apparatus, the band-pass filter may be curved.

In another embodiment of the lamp light trap and heat transfer apparatus, the woolen material may be formed in an ordered array.

In another embodiment of the lamp light trap and heat transfer apparatus, the woolen material may be formed of a disordered collection of material fibers.

In another embodiment of the lamp light trap and heat transfer apparatus, the apparatus may also include a fan provided adjacent the heat sink; the fan may be adapted to aid in the dissipation of the heat generated when the light is absorbed.

In another embodiment of the lamp light trap and heat transfer apparatus, the apparatus may also include a fan provided adjacent the heat sink; the fan may be adapted to aid in the dissipation of the heat generated when the light is absorbed and may be selected from the group consisting of a muffin fan, a volume blower, a cage blower, compressed air, and natural convection.

The invention also contemplates a method of irradiating an object with light having a wavelength in a first range. This method includes: (a) generating light having a plurality of wavelengths including light having a wavelength in a first range and a wavelength outside of the first range; (b) filtering the light so that light having wavelengths in the first range is directed toward an object to be cured and light having wavelengths outside of the first range is not directed to the object; (c) absorbing the light having wavelengths outside of the first range by a heat sink comprising a woolen material; (d) dissipating heat generated when the light having wavelengths outside of the first range is absorbed by the heat sink; and (e) irradiating the object with the light having a wavelength in the first range.

In another embodiment of the method, the woolen material may be selected from the group consisting of steel, aluminum, carbon steel, stainless steel, and bronze.

Another embodiment of the method may include: (f) shielding the object from the light having a wavelength outside of the first range.

In another embodiment of the method, the step of dissipating heat generated when the light having wavelengths outside of the first range is absorbed by the heat sink may include: passing air over the heat sink.

In another embodiment of the method, the step of dissipating heat generated when the light having wavelengths outside of the first range is absorbed by the heat sink may include: passing air over the heat sink and the method may also include: (f) shielding the object from the light having a wavelength outside of the first range.

In another embodiment of the method, the step of dissipating heat generated when the light having wavelengths outside of the first range is absorbed by the heat sink may include: passing air over the heat sink and the method may also include: (f) shielding the object from the light having a wavelength outside of the first range, wherein the woolen material may be selected from the group consisting of steel, aluminum, carbon steel, stainless steel, and bronze.

In another embodiment of the method, the light in the first range may have wavelengths between about 200 nm and about 450 nm.

In another embodiment of the method, the light outside of the first range may have wavelengths of greater than about 450 nm.

In another embodiment of the method, the light in the first range may be ultraviolet light and/or the light outside of the first range may be visible light, infrared light, or a combination of visible light and infrared light.

In another embodiment of the method, the step of filtering the light may be performed using a band-pass filter.

In another embodiment of the method, the step of filtering the light may be performed using a band-pass filter which is a cold mirror.

These and other features, aspects, and advantages of the present invention will become more apparent from the following description, appended claims, and accompanying exemplary embodiments shown in the drawings.

BRIEF DESCRIPTION OF THE DRAWINGS

The accompanying drawings, which are incorporated in and constitute a part of the specification, illustrate an embodiment of the invention and together with the description, serve to explain the principles of the invention.

DETAILED DESCRIPTION

Figure 1:
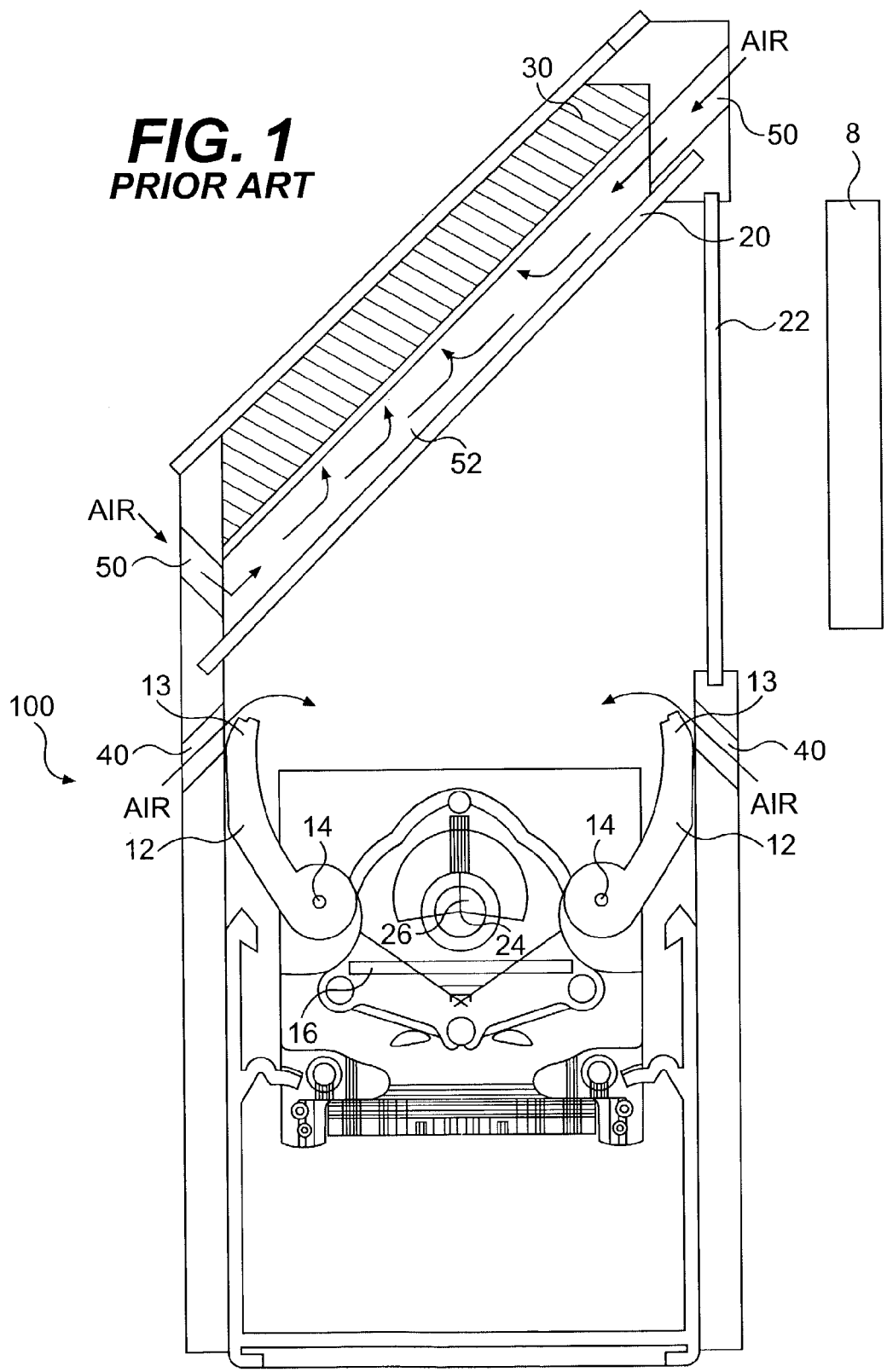
FIG. 1 is a schematic view of a prior art lamp housing.

Reference will now be made in detail to embodiments of the invention, which are illustrated in the drawings. An effort has been made to use the same reference numbers throughout the drawings to refer to the same or like parts.

Figure 2:
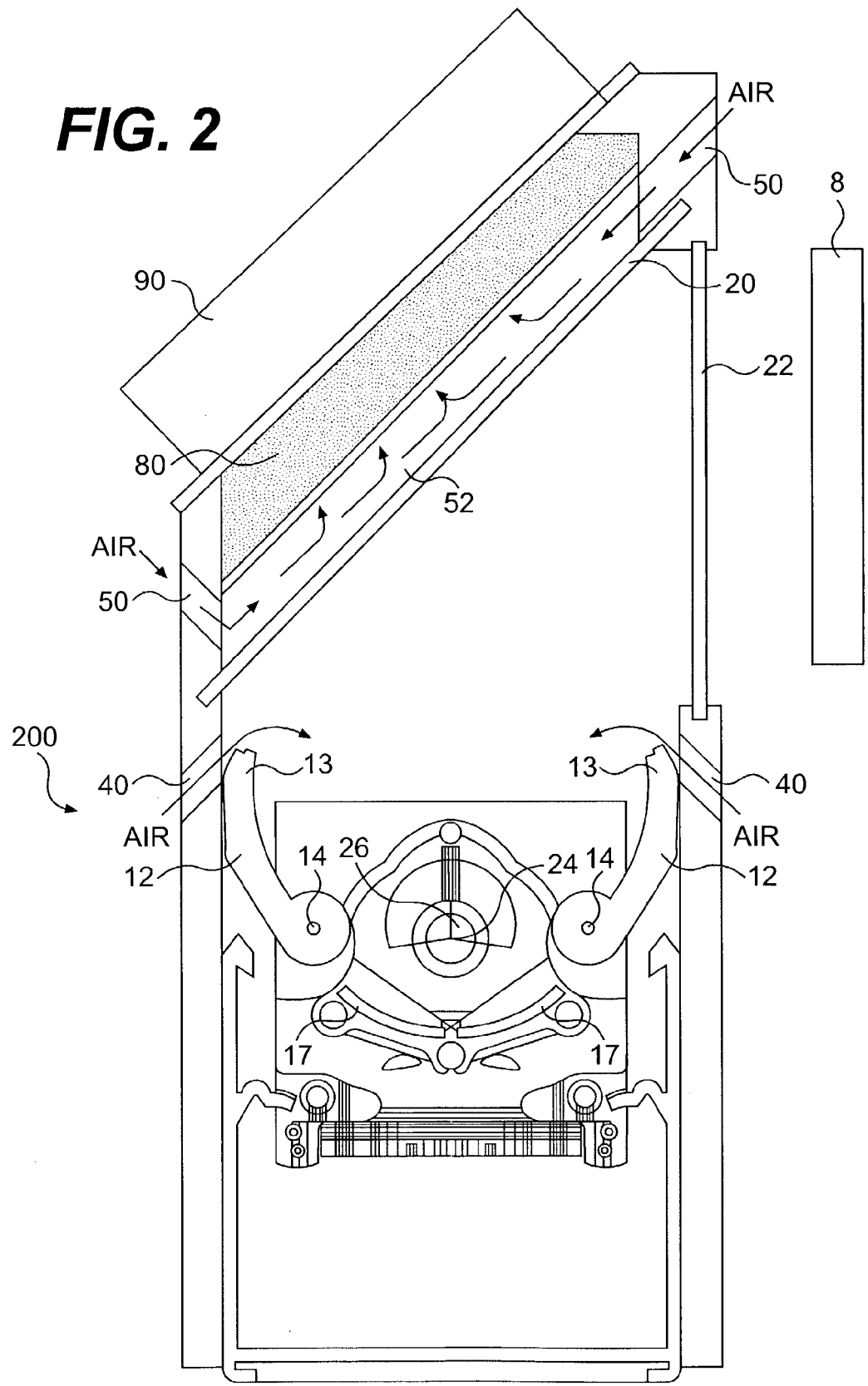
FIG. 2 is a schematic view of a lamp housing according to one embodiment of the invention.
Figure 3:
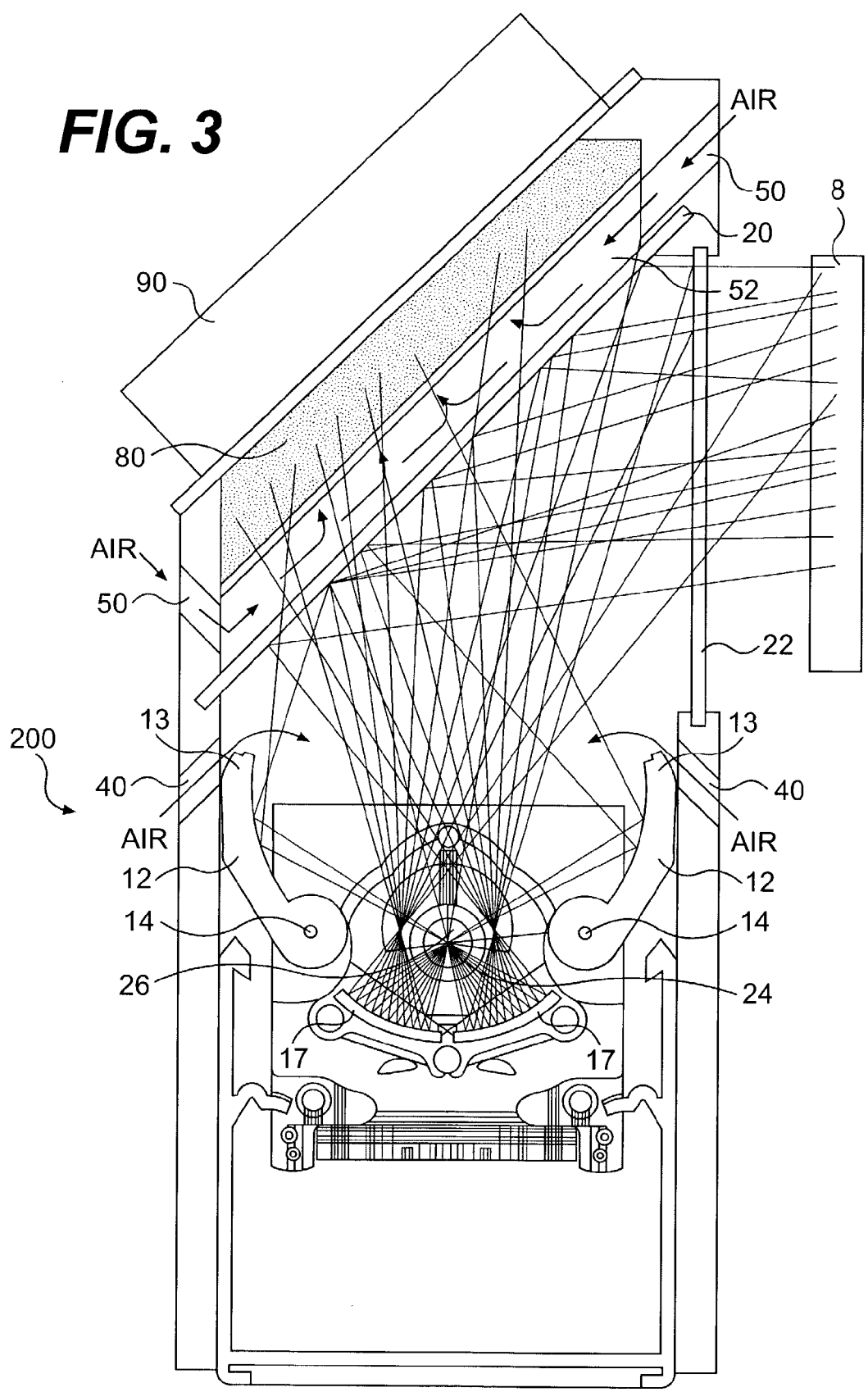
FIG. 3 is a schematic view of the lamp housing of FIG. 2 illustrating how some of the light generated by a light source is reflected by a band-pass filter so as to leave the housing via a window, whereas other light generated by the light source passes through the band-pass filter.

FIG. 2 is a schematic view of a lamp housing 200 according to one embodiment of the invention. Like the prior art lamp housing shown in FIG. 1, this embodiment of the invention includes a lamp housing 200 containing a light source 26, which projects diverging light having a variety of wavelengths. In this embodiment, however, the light is directed toward shutters 12 and toward a curved reflective mirror 17 which may be a cold mirror and which may be in two parts, as shown. As shown in FIG. 3, the curved reflective mirror 17 and the shutters 12 reflect the light toward a band-pass filter 20, which is preferably a cold mirror, and which may be a folding mirror (i.e., an optical device used to change the direction of light rays).

Figure 4:
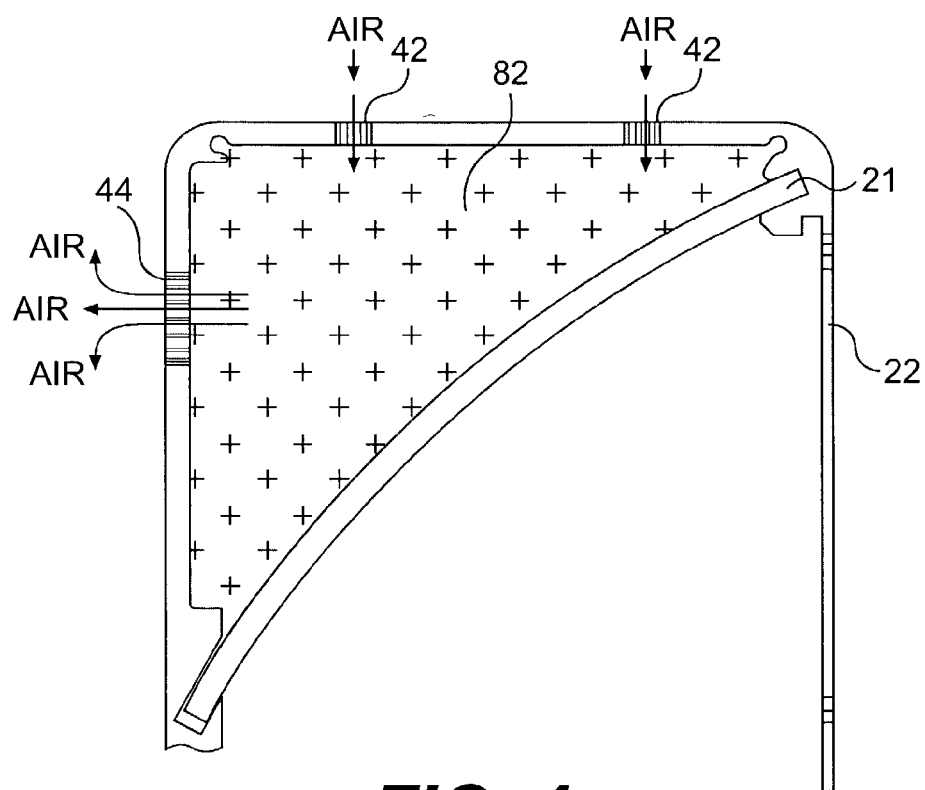
FIG. 4 is a schematic view of an alternate embodiment of a band-pass filter and an alternate embodiment heat sink which can be used in a lamp housing according to the current invention.

In one embodiment, the band-pass filter 20 may be a cold mirror. Further, it may also be a folding mirror. This band-pass filter 20 could be used to redirect a portion of the light (e.g., the UV light) to a two dimensional or three dimensional plane or object at which, for example, UV curing is to take place. If the band-pass filter 20 were planar in nature (as shown in FIGS. 2 and 3, the angle of this band-pass filter 20 with respect to the long axis of the lamp could be, for example, about 45°. However, there is no requirement that the band-pass filter 20 be planar in shape. Rather, the shape of the reflective surface of the band-pass filter 20 may be, but is not limited to, spherical, cylindrical, aspheric, a series of flats (i.e., a series of short planar surfaces joined together to form a curved surface), for example. FIG. 4 shows an example of a curved band-pass filter 21.

The band-pass filter 20 may be fabricated from non-metallic materials which are, for example, extruded, machined, formed, cast, or molded. In addition, the band-pass filter 20 may be created from a substrate material which is subjected to any number of finishing methods including, but not limited to, polishing, coating, and plating. For example, the band-pass filter 20 may be coated and polished.

Substrate materials transparent to particular wavelengths of light may be used in conjunction with the band-pass filter 20. In one embodiment, optical coatings that reflect specific wavelength photonic energy having angles of incidence from about 0° to about 45° (and greater) may be employed. Additionally, the optical coatings may be used to transmit different specific wavelength photonic energy having angles of incidence from about 0° to about 45° (and greater).

The band-pass filter 20 is adapted to reflect light having a wavelength which falls within a specified range and to transmit light having wavelengths outside of that range. For example, if a cold mirror is used as the band-pass filter 20, it may reflect light having wavelengths between about 200 nm and about 450 nm (e.g., UV light) and transmit light outside of this range, including visible light and infrared light. The light which is reflected by the band-pass filter 20 passes through a protective window 22 (as shown in FIG. 3) and may be used in applications calling for a particular type of light, e.g., UV light. For example, the light passing through the protective window 22 could be used to cure an object 8, as shown in FIG. 3.

The remaining light (e.g. visible/IR) light, which is transmitted through the band-pass filter 20, passes through the air corridor 52 and into the heat sink 80, where it may be absorbed and converted into heat energy via radiant heat transfer. Unlike the solid heat sink 30 in the prior art, the heat sink 80 according to one embodiment of the invention is formed of a woolen material comprising a random array of fibers some of which may be curved and twisted around each other. Preferably, the heat sink 80 is formed of a metal wool such as, for example, carbon steel wool, aluminum wool, bronze wool, or stainless steel wool. Each of these metal wool types is available form International Steel Wool/BonnCo Abrasives, P.O. Box 2237, Mission, Tex. 78537. In addition, wool materials having high coefficients of thermal conductivity and low reflectivity values in a desired wavelength range may be used.

Using a woolen material for the heat sink 80 has been shown to have one or more of the following advantages over the solid prior art heat sink 30. First, the cost of the woolen heat sink 80 is much less than the cost of solid heat sinks 30. Second, the weight of the woolen heat sink 80 is far less than the prior art solid heat sink 30. Third, the woolen heat sink 80 of the present invention has been found to have greater heat dissipation capacity and efficiency than the prior art solid heat sink 30, due to the air present within it (and increased surface area associated therewith). Specifically, due to the greater surface area provided by the fibers, their thin cross-section readily gives up heat via convection heat transfer to the circulating air. Further, because of the woolen nature of the heat sink material, the air used to carry away the heat can circulate and contact nearly 100% of the fiber surface area.

Air, which is fed into the air corridor 52 via inlets 50, is used to cool the heat sink 80. In addition, the cooling of the heat sink 80 can be further aided by using a fan 90 such as, for example, a muffin fan, pressure blower, volume blower, cage blower, compressed air, natural convection fan, or other appropriate fan design. In one embodiment, the fan 90 is positioned on the side of the heat sink 80 opposite the air corridor 52. In one embodiment, the fan 90 serves to pull through the heat sink 80 air which is supplied thereto by the air corridor 52. In addition, air (which may be fed into the housing 200 via inlets 40) may be used to cool the light source 26, the shutters 12, and/or the curved reflective mirror 17.

In operation, the shutters 12 will be moved to the open position in which the distal ends 13 of the shutters are away from each other. The light source 26 will be activated to radiate light energy. Some of the light will reflect off of the curved two-part reflective surface 17 and off of the shutters 12 toward the band-pass filter 20, whereas some of the light will travel directly from the light source 26 to the band-pass filter 20. Light having wavelengths in a specified range (e.g., about 200 nm to about 450 nm) will be reflected by the band-pass filter 20 and projected through the protective window 22. The remainder of the light (i.e., light having wavelengths which do not fall within the specified range) will be transmitted through the band-pass filter 20 and the air corridor 50 and into the heat sink 80, where the light energy will be converted into heat energy. The heat energy may be dissipated by the influx of air in the air corridor 52 and by a fan 90, if one is provided.

FIG. 4 is a schematic view of an alternate embodiment of the band-pass filter 21 and an alternate embodiment of the heat sink 82 which can be used in a lamp housing according to the present invention. In this embodiment, the band-pass filter 21, which may be a cold mirror, is curved. However, the band-pass filter 21 performs the same function, i.e., it reflects light having wavelengths within a specified range through the protective window 22, and transmits light having other wavelengths into the heat sink 82. It should be readily appreciated that this curved band-pass filter 21 could be used in the aforementioned embodiment of the lamp housing 200, provided that the manner in which the light is reflected by the curved reflective mirror 17 and the shutters 12 were correspondingly changed to direct light toward the band-pass filter 21 in such as manner so that the band-pass filter could redirect light having specific wavelengths through the protective window 22.

FIG. 4 also depicts an alternate embodiment woolen heat sink 82. In this embodiment, an air corridor is not provided because air is channeled directly into the heat sink 82 via one or more inlets 42. Further, the air channeled into the heat sink 82 exits via one or more outlets 44. In addition, like the first embodiment, the air cooling of the heat sink 82 may be aided by a fan (not shown in FIG. 4) such as, for example, a muffin fan, volume blower, cage blower, compressed air, natural convection, or other appropriate fan type.

Figure 5:
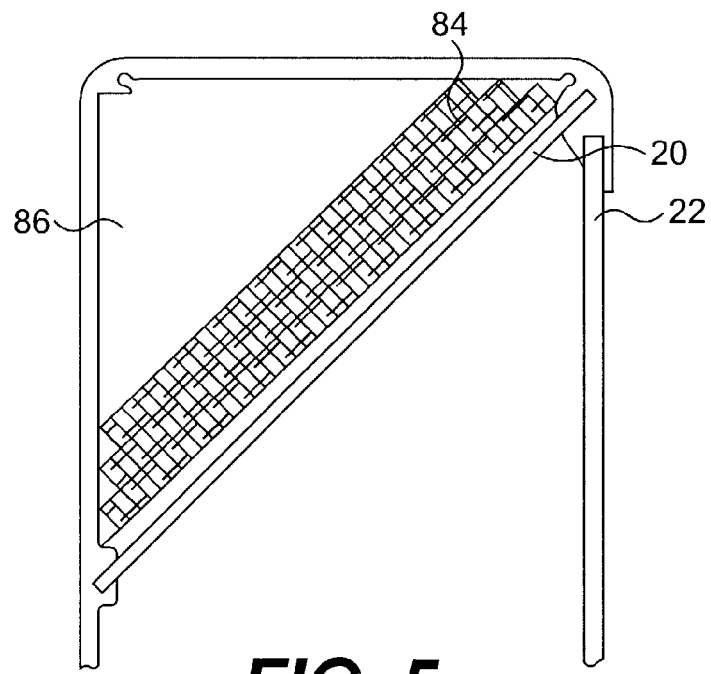
FIG. 5 is a schematic view of an alternate embodiment of a band-pass filter and associated heat sink.

FIG. 5 is a schematic view of an alternate embodiment of a band-pass filter 20, which may be cold mirror, and associated heat sink 84. In this embodiment, a cool air corridor is not provided. However, in this embodiment, the heat sink 84, which is formed by an ordered array of woolen fibers (as shown), is provided adjacent an air pocket 86 into which heat may diffuse by convection and dissipation. An ordered array heat sink formed of a woolen material may be manufactured in such as manner as to achieve passages which have substantially fixed (and possibly the same) sizes and which are arranged in a predefined order.

Although the aforementioned describes embodiments of the invention, the invention is not so restricted. It will be apparent to those skilled in the art that various modifications and variations can be made to the disclosed preferred embodiments of the present invention without departing from the scope or spirit of the invention. For example, although each and every combination of a band-pass filter 20, 21, a woolen heat sink 80, 82, 84, and/or a fan 90 was not described herein, all such combinations are fully within the scope of the invention.

In addition to the aforementioned modifications, the invention is not limited to the field of lamps. Accordingly, it should be understood that the apparatus and method described herein are illustrative only and are not limiting upon the scope of the invention, which is indicated by the following claims.

What is claimed is:

1. A lamp light trap and heat transfer apparatus comprising:
   a light source adapted to radiate light having a plurality of wavelengths including light having a wavelength in a first range and a wavelength outside of the first range;
   a band-pass filter positioned in the path of at least some of the light which the light source is adapted to radiate, the band-pass filter being adapted to reflect light having wavelengths in the first range and to transmit light having wavelengths outside of said first range;
   a heat sink provided proximate the band-pass filter, wherein the heat sink is formed of a woolen material adapted to absorb the light transmitted by the band-pass filter.

2. The apparatus according to claim 1, wherein the woolen material is selected from the group consisting of steel, aluminum, carbon steel, stainless steel, and bronze.

3. The apparatus according to claim 1, further comprising:
   a protective window shielding access to the band-pass filter, wherein the light reflected by the band-pass filter passes through the protective window.

4. The apparatus according to claim 1, further comprising:
   an air cooling corridor positioned between the band-pass filter and the heat sink, wherein the air cooling corridor is adapted to aid in dissipation of heat generated when the light transmitted through the band-pass filter is absorbed by the heat sink.

5. The apparatus according to claim 4, further comprising:
   a protective window shielding access to the band-pass filter, wherein the light reflected by the band-pass filter passes through the protective window.

6. The apparatus according to claim 5, wherein the woolen material is selected from the group consisting of steel, aluminum, carbon steel, stainless steel, and bronze.

7. The apparatus according to claim 1, wherein the light in the first range has wavelengths between about 200 nm and about 450 nm.

8. The apparatus according to claim 1, wherein the light outside of the first range has wavelengths of greater than about 450 nm.

9. The apparatus according to claim 1, wherein the band-pass filter is a cold mirror.

10. The apparatus according to claim 1, wherein the light in the first range is ultraviolet light, and wherein the light outside of the first range is visible light, infrared light, or a combination of visible light and infrared light.

11. The apparatus according to claim 1, wherein the band-pass filter is planar.

12. The apparatus according to claim 1, wherein the band-pass filter is curved.

13. The apparatus according to claim 1, wherein the woolen material is formed in an ordered array.

14. The apparatus according to claim 1, wherein the woolen material is formed of a disordered collection of material fibers.

15. The apparatus according to claim 1, further comprising:
   a fan provided adjacent the heat sink, wherein the fan is adapted to aid in the dissipation of the heat generated when the light is absorbed.

16. The apparatus according to claim 15, wherein the fan is selected from the group consisting of a muffin fan, a volume blower, a cage blower, compressed air, and natural convection.

17. A method of irradiating an object with light having a wavelength in a first range, the method comprising the steps of:
   generating light having a plurality of wavelengths including light having a wavelength in a first range and a wavelength outside of the first range;

filtering the light so that light having wavelengths in the first range is directed toward an object to be cured and light having wavelengths outside of the first range is not directed to the object;

absorbing the light having wavelengths outside of the first range by a heat sink comprising a woolen material;

dissipating heat generated when the light having wavelengths outside of the first range is absorbed by the heat sink; and irradiating the object with the light having a wavelength in the first range.

18. The method according to claim 17, wherein the woolen material is selected from the group consisting of steel, aluminum, carbon steel, stainless steel, and bronze.

19. The method according to claim 17, further comprising the step of:

shielding the object from the light having a wavelength outside of the first range.

20. The method according to claim 17, wherein the step of dissipating heat generated when the light having wavelengths outside of the first range is absorbed by the heat sink comprises:

passing air over the heat sink, the air being provided by an air corridor positioned adjacent the heat sink.

21. The method according to claim 20, further comprising the step of:

shielding the object from the light having a wavelength outside of the first range.

22. The method according to claim 21, wherein the woolen material is selected from the group consisting of steel, aluminum, carbon steel, stainless steel, and bronze.

23. The method according to claim 17, wherein the light in the first range has wavelengths between about 200 nm and about 450 nm.

24. The method according to claim 17, wherein the light outside of the first range has wavelengths of greater than about 450 nm.

25. The method according to claim 17, wherein the light in the first range is ultraviolet light, and wherein the light outside of the first range is visible light, infrared light, or a combination of visible light and infrared light.

26. The method according to claim 17, wherein the step of filtering the light is performed using a band-pass filter.

27. The method according to claim 26, wherein the band-pass filter is a cold mirror.

* * * * *